(12) United States Patent
Ferrer-Dalmau Nieto et al.

(10) Patent No.: US 9,415,690 B2
(45) Date of Patent: Aug. 16, 2016

(54) AUTONOMOUS CONTROL SYSTEM

(71) Applicant: Microelectronica maser S.L., Mendaro (Guipuzcoa) (ES)

(72) Inventors: Francisco Ferrer-Dalmau Nieto, Guipuzcoa (ES); Francisco Javier Vicandi Unanue, Guipuzcoa (ES); Carlos Javier Iriondo Arrizabalaga, Guipuzcoa (ES); Jesus Maria Iriondo Arrizabalaga, Guipuzcoa (ES)

(73) Assignee: MICROELECTRONICA MASER, S.L., Mendaro (Guipuzcoa) (ES)

( * ) Notice: Subject to any disclaimer, the term of this patent is extended or adjusted under 35 U.S.C. 154(b) by 0 days.

(21) Appl. No.: 14/646,517

(22) PCT Filed: Jan. 15, 2014

(86) PCT No.: PCT/ES2014/070019
§ 371 (c)(1),
(2) Date: May 21, 2015

(87) PCT Pub. No.: WO2014/118409
PCT Pub. Date: Aug. 7, 2014

(65) Prior Publication Data
US 2015/0298552 A1  Oct. 22, 2015

(30) Foreign Application Priority Data

Jan. 29, 2013  (ES) .................................. 201330100

(51) Int. Cl.
| | |
|---|---|
| *B60L 3/00* | (2006.01) |
| *B60L 7/18* | (2006.01) |
| *B60W 10/08* | (2006.01) |
| *B60W 10/26* | (2006.01) |
| *H02J 7/00* | (2006.01) |
| *B60L 11/18* | (2006.01) |
| *B60L 15/20* | (2006.01) |

(52) U.S. Cl.
CPC ............. *B60L 3/0046* (2013.01); *B60L 3/0092* (2013.01); *B60L 7/18* (2013.01); *B60L 11/1868* (2013.01); *B60L 15/2009* (2013.01); *B60W 10/08* (2013.01); *B60W 10/26* (2013.01); *H02J 7/00* (2013.01); *B60L 2220/44* (2013.01); *B60L 2220/46* (2013.01); *B60L 2240/46* (2013.01); *B60L 2260/28* (2013.01); *Y02T 10/7005* (2013.01); *Y02T 10/7066* (2013.01); *Y02T 10/7258* (2013.01); *Y10S 903/907* (2013.01)

(58) Field of Classification Search
None
See application file for complete search history.

(56) References Cited

U.S. PATENT DOCUMENTS

| | | | |
|---|---|---|---|
| 5,350,994 A * | 9/1994 | Kinoshita | ........... B60L 11/1803 320/116 |
| 7,472,766 B2 | 1/2009 | Yamamoto et al. | |
| 7,872,443 B2 | 1/2011 | Ward | |
| 2001/0039230 A1 * | 11/2001 | Severinsky | ............ B60H 1/004 477/3 |
| 2005/0052080 A1 * | 3/2005 | Maslov | ..................... B60L 8/00 307/10.1 |

FOREIGN PATENT DOCUMENTS

| | | |
|---|---|---|
| ES | 1078169 U | 12/2012 |
| JP | 2000-59904 A | 2/2000 |

* cited by examiner

*Primary Examiner* — Thomas Tarcza
*Assistant Examiner* — Garrett Evans
(74) *Attorney, Agent, or Firm* — Jacobson Holman, PLLC.

(57) ABSTRACT

The regenerative energy produced during the braking of a vehicle is used for powering a secondary battery, that is independent from the main battery, and, in the event of a complete failure of said main battery, allows the continued operation of the basic services such as power steering, lights, the brake servo unit, and electronics, as a result of the combined action of said autonomous system that includes a capacitor bank which powers said services either directly or via the secondary battery. The system comprises an interface of the electronic power and control unit, an electronic power and control unit, applied to the steering and pedals, and an ECU power controller and port.

7 Claims, 3 Drawing Sheets

AUTONOMOUS CONTROL SYSTEM

OBJECT OF THE INVENTION

More specifically the invention relates to an autonomous power generation system, using the regenerative energy generated by braking a vehicle for powering a secondary battery, that is independent from the main battery, and, in the event of a complete failure of said main battery, allows the continued operation of the basic services such as power steering, lights, the brake servo unit, and electronics, as a result of the combined action of said autonomous system that includes a capacitor bank which powers said basic services via the secondary battery.

STATE OF THE ART

There are different models of automobiles on the market as state of the art equipped with at least one electric motor as a means of propulsion, powered by a conventional battery, the main battery, with a second battery called secondary to supply certain vehicle functions for starting when the vehicle is stationary.

As a result of the propulsion system of these types of automobiles, they need to regularly charge the main battery that we will say has approximately 300 volts, and this supplies energy not only to the electric propulsion motor, but also to other vehicle services such as power assisted steering, servo brakes, ABS, with different assistance electric motors such as electric windows, movement of seats and seat backs, air conditioning, lighting and others.

Total failure of the main battery when the vehicle is in movement will render all the principal automobile systems inoperative, for example the driver in this case will have to move the steering wheel with only physical force, and regarding brakes, the lack of multiplication when pressing the brake pedal will result in weaker braking, therefore, the danger situation in these cases, just with the failure of the mentioned services, is very high and can be the cause of accidents or collisions with other vehicles.

The secondary battery, which we will call signal battery (12 volts) that electric automobiles have is insufficient for intensive use when the main battery is discharged, contrasting with automobiles that have an internal combustion engine and are equipped with an alternator to charge the battery, something that does not exist in electric vehicles, motivated by the need to save energy and maximise the duration of the main battery so it will remain in operation for the longest number of kilometers possible.

The main and secondary battery installations have different wiring systems, the former at 300 volts and the second at 12 volts, used for starting, stable power supply signal and emergency For example in Utility Model No. 201200498 whose aim is an "Electronic device for rapidly charging electric vehicles" this device is used to rapidly charge lead or lithium batteries, of which only the latter are enabled, to receive slow charges. As indicated in the report, this device uses temporary energy storage by means of high capacity capacitor bank, this bank is charged by a charger connected to the mains electricity.

SCOPE OF THE INVENTION

To use the energy produced by regenerative braking to power basic services in the case of total failure of the automobile's main battery, achieving in this manner, by means of the autonomous control system among others the following advantages:

- To reduce the number of charges of the main battery, increasing its life, as the system advocated would use regenerative energy stored in the secondary battery to move the steering and braking motors.
- To achieve greater energy efficiency, as it is not necessary to use intermediate steps.
- Greater safety, as in the case of failure of power supply from the main battery, it would be possible to maintain basic control of the automobile until it can safely stop, by means of the secondary battery.

Another of the aims of the invention is to provide, in addition to basic services, electric window operation, heating, air conditioning and comfort functions.

DESCRIPTION OF THE INVENTION

The invention is applicable to vehicles in which one of their motors is electric, the so-called hybrids, or purely electric automobiles, in which the wheels are equipped with at least one electric motor for traction, and one or more electric motors applied to steering. In addition to these, each wheel is fitted with motors, with traction control electronics, such as EPS and ABS, to which is added a sensor (encoder) that detects position and speed, so traction (ESP) and non-skid braking (ABS) can be controlled to make use of regenerative energy when braking, which is sent to a capacitor bank with the dual aim of stabilising the regenerative energy by modifying the peaks of current produced in the electric devices when braking, and storing it as reserve for the secondary battery.

The capacitor bank can be installed, in each of the wheels of the vehicle, or use a battery for all the wheels, installed on the vehicle platform. In the first case, the traction (motor), steering and brake together with the autonomous control system (ACS), that controls traction (EPS type) and braking (ABS type), the control of adherence is completely autonomous and independent from the rest of the vehicle and in case of main battery failure, it will continue working.

Regenerative energy is generated by the traction motor, which when without power from the main battery, will work as a simple dynamo.

The autonomous control system, hereinafter ACS, referred to in the invention, comprises as main elements:

- Gateway and controller of the EPCs, powered by the secondary battery.
- Electronic power and control unit applied to the steering and pedals, which we will call EPC.
- Interface of the previous unit, located on the steering wheel.
- Automated wheel controller device (one for each wheel).

When, through the controlling unit, the ACS detects a failure of power from the main battery, it takes power from the secondary battery, witch will momentarily replace the main one, thus retaining control of the vehicle and its main elements, basically they are centralised in the wheel's electronic controlling, summarised as steering+traction+brakes+brakes+ABS+EPS.

Alternatively, the autonomous control system can operate without any modification on the front wheels, the rear wheels or on all four wheels.

Other details and characteristics shall be shown throughout the description below referring to drawings attached to this report which are shown for illustrative but not limiting purposes only in a drawing of the invention.

DESCRIPTION OF THE DRAWINGS

Below is a list of the different parts of the system, which are indicated in the drawings attached to this report with their respective numbers; (10) wheels, (11) sensor, (12) platform, (13) capacitor bank, (14) main battery, (15) secondary battery, (16) lights, (17) power-steering, (18) brake servo unit, (19) ABS, (20) EPS, (21) ACS, (22) capacitor bank, (23) automated wheel controller device, (24) interface of the electronic power and control unit, (25) electronic power and control unit applied to the steering and pedals, (26) EPC power controller and port, (27) traction motor.

DESCRIPTION OF THE INVENTION

Figure 1:
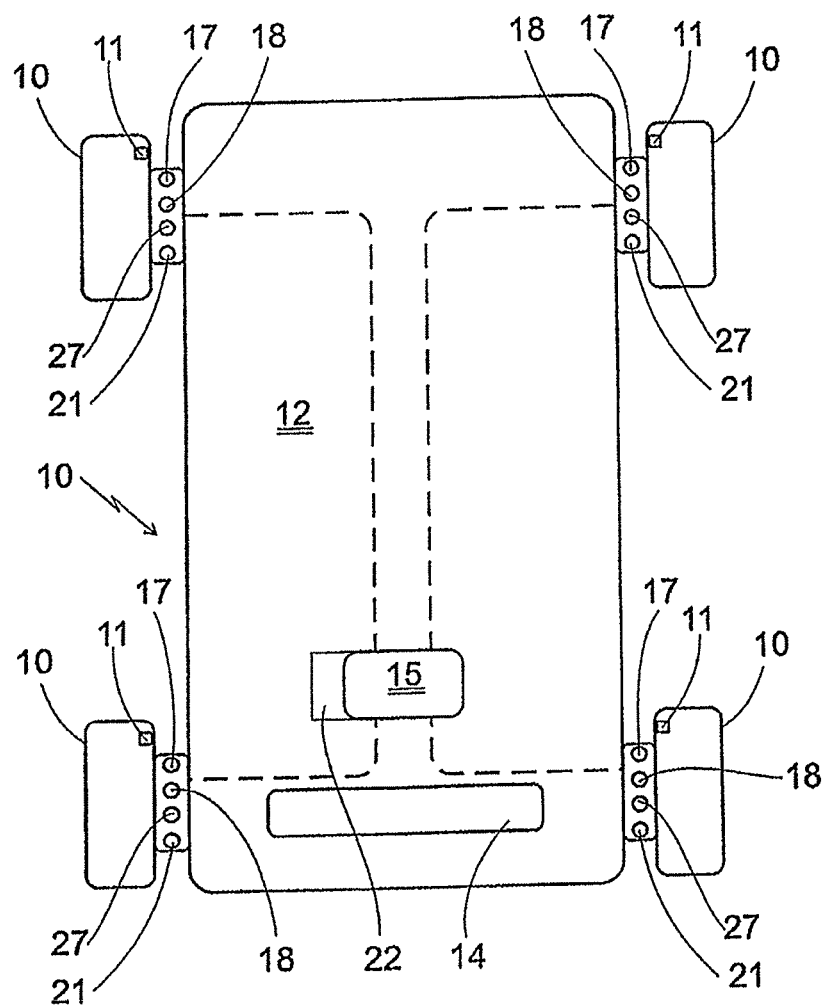
FIG. 1 is a schematic top plan view of an electric vehicle with the involved main parts.

In one of the preferred embodiments of the invention, as can be seen in FIG. 1, the vehicle has a platform (12), on which wheels (10) are mounted near its corners, between the platform (12) and the wheels (10) each wheel (10) incorporates the servo steering (17), the servo brakes (18) and the traction motor (27).

Also on the upper parts of the platform (12) at the rear is the main battery (14) and in the middle area the secondary battery (15) and the capacitor bank (22), the main battery (14) supplies the electric traction motors (27) and part of the services, and the secondary battery (15) powers other services active when the vehicle is stationary, such as for example seat movement, interior lights and others.

Figure 2:
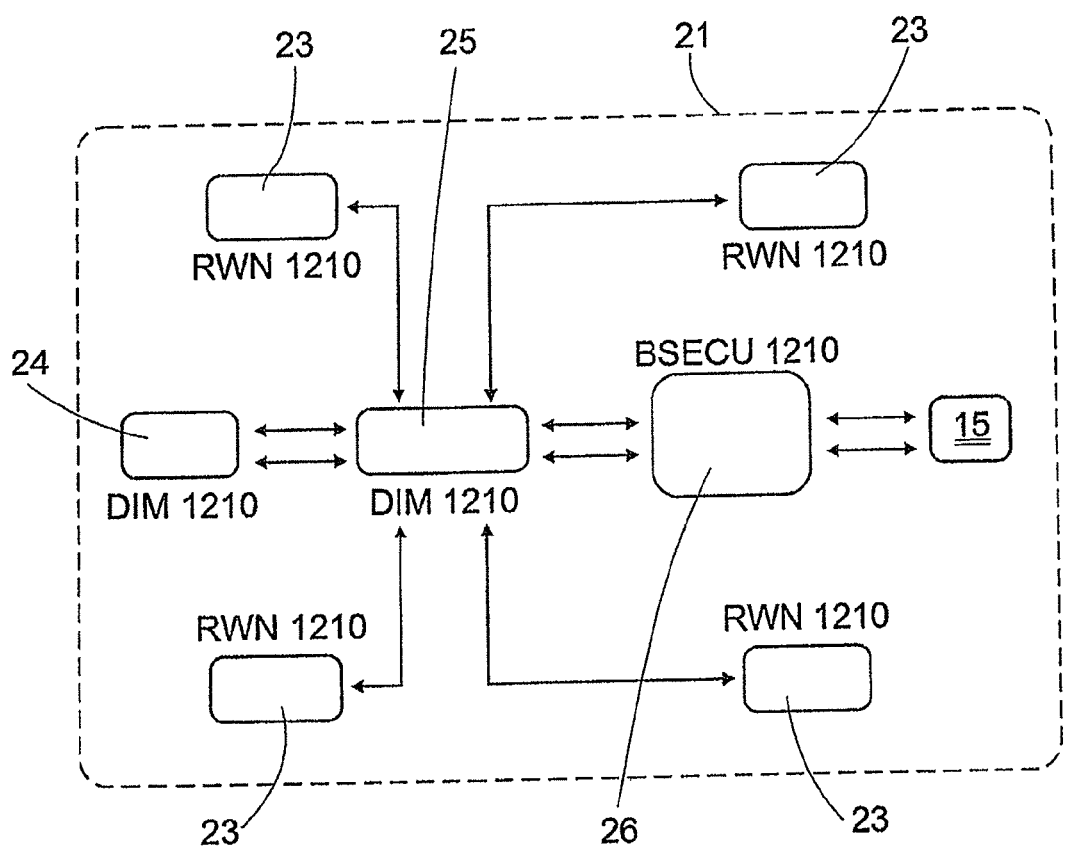
FIG. 2 is a block diagram of the automatic control system (21).

As can be seen in FIG. 2, the main battery (14) transmits the power necessary for normal operation of the wheels (10), each of which has an automated (23) controlling device installed, which includes the following electric motors:

Power steering (17),
Servo brake unit (18), ABS and adherence control,
Traction (27), EPS type.

The servo steering (17) and servo brake (18), traction motor (27) and its corresponding electronics, are individualised in each wheel (10), controlled in each wheel (10) by an electronic device (23), called an EPC, which is an electronic power and control unit, which receives the corresponding signal from the interface (24), installed on the vehicle's steering wheel, through (25), the control and power unit assigned to the steering wheel of the servo steering (17) and servo brakes (18), which in case of failure of the main battery (14), it is powered with the power controller gateway (26) necessary from the secondary battery (15), as can be seen in FIG. 2, adding as an object of the invention, an encoder type sensor (11) that detects sudden speed changes in wheel rotation, and with the aid of the ACS electronics (21), it converts the regenerative energy generated by the traction motor (27) when braking, by changing the polarity of (27) in an intensity that is sent to a capacitor bank (22), which in addition to storing the electricity generated while the vehicle is braking, stabilizes the peaks of regenerative energy, moving them from the capacitor bank (22) to the secondary battery (15).

Another of the objectives of the invention is that the secondary battery (15) powers the servo steering and servo brakes (17-18) in case of total power failure of the main battery (14), thus avoiding dangerous situations and enabling the user to stop the vehicle safely (17-18).

Another of the objectives of the invention is to directly use the energy generated when braking with the servo brake (17), without having to pass thorough the secondary battery (15), storing the regenerative energy created by the traction motor (27) in the aforementioned capacitor bank (22), so that thanks to the integration of (22) in the ACS (21), the number of charges of the main battery (14) is reduced, increasing its service life powering the motors of the servo brake and servo steering (17-13) located in each wheel (10).

Figure 3:
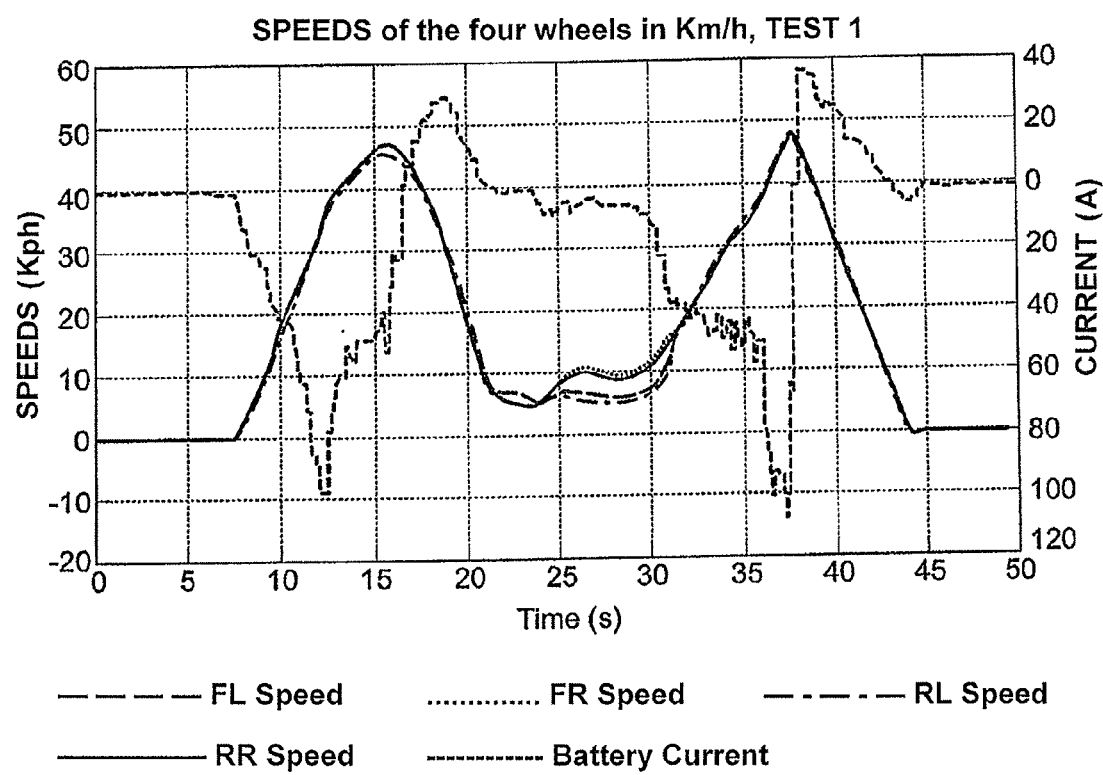
FIG. 3 is a graph displaying variations of current occurring in the different moments of positive and negative acceleration of the wheel.

The ACS (21) automatic control system begins to operate when the user of the vehicle presses the brake pedal, moment, in which the sensor (11) instantly detects the sudden change of angular speed of the wheel (10), and inverts the rotation of the electric traction motors (27) located in each of the wheels (10), by inverting the polarity, the motors thus act as generators of current, like a dynamo, as can be seen in the drawing of FIG. 3, which charges the capacitor bank (22), one of the possibilities is that (22) it directly powers the servo steering (17) and servo brakes (18), or charges the secondary battery (15) and this goes to (17-18).

The ACS control system (21) can be applied, as is one of the objectives of the invention to four or just two wheels (10).

Having sufficiently described this invention using the figures attached, it is easy to understand chat any modification may be made to the detail which may be deemed to be appropriate, whenever these changes do not alter the essence of the invention summarised in the following claims.

The invention claimed is:

1. An autonomous control system applicable to hybrid and/or electric vehicles wherein the vehicle comprises a platform on which wheels are mounted near corners of the platform, a main battery, a secondary battery and a capacitor bank, comprising
    an electronic power and control unit applied to steering and pedals, which detects failure of the main battery, an interface of the electronic power and control unit, located on a steering wheel,
    a gateway and a controller of the electronic power and control unit, powered by the secondary battery, and
    an automated wheel controller device for each wheel, which comprises following electronic motors; a power steering, a servo brake unit, and a traction, wherein the servo steering, the servo brake, and the traction motor and their corresponding electronics, are individualized in each wheel, a sensor for each wheel that detects sudden speed changes in wheel rotation,
wherein the system is activated when the main battery fails.

2. The autonomous control system according to claim 1 wherein the autonomous control system can work directly from the capacitor bank, powering the electric motors of the servo steering, servo brakes and traction.

3. The autonomous control system according to claim 1 wherein regenerative energy created when braking the vehicle is used to power lights, electric windows, general vehicle electronics, without having to pass through the main battery.

4. The autonomous control system according to claim 1 which is installed in each wheel.

5. The autonomous control system according to claim 1 which is installed on the platform.

6. The autonomous control system according to claim 1 wherein the sensor with aid of the autonomous control system, converts the regenerative energy generated by the traction motor when braking, by changing the polarity of said traction motor in an intensity that is sent to the capacitor bank, which in addition to storing the electricity generated while the vehicle is braking, stabilizes peaks of regenerative energy, moving the regenerative energy from the capacitor bank to the secondary battery.

7. The autonomous control system according to claim 1 wherein the autonomous control system detects a failure of power from the main battery through the controlling unit, taking power from the secondary battery.

* * * * *